Sept. 24, 1968      A. J. CAMPANELLA      3,403,254
GLIDE PATH APPROACH SYSTEM FOR LANDING AIRCRAFT
UTILIZING NUCLEAR RADIATION
Filed April 6, 1964      6 Sheets-Sheet 1

INVENTOR
ANGELO J. CAMPANELLA

BY *William T. Fryer III*

ATTORNEY

INVENTOR
ANGELO J. CAMPANELLA

United States Patent Office

3,403,254
Patented Sept. 24, 1968

3,403,254
GLIDE PATH APPROACH SYSTEM FOR LANDING AIRCRAFT UTILIZING NUCLEAR RADIATION
Angelo J. Campanella, Columbus, Ohio, assignor to Industrial Nucleonics Corporation, a corporation of Ohio
Filed Apr. 6, 1964, Ser. No. 357,494
19 Claims. (Cl. 250—83.3)

The present invention relates to guidance of moving crafts under adverse weather conditions where visibility to the human eye is too low for the pilot to follow a desired path. More particular the present invention is concerned with method and apparatus for using penetrative radiation, such as nuclear radiation, to maintain the craft on a predetermined path.

The use of penetrative radiation for guiding a craft has taken several forms of apparatus and method. For example, it was proposed to locate an X-ray beacon at an airport and determine the direction of radiation from an airplane with a hand operated viewer, U.S. Patent 1,948,552, to S. L. Weber et al., issued Feb. 27, 1934. Another approach was to mount infrared seeking devices on an aircraft that pointed to an infrared beacon near the airport to operate a device that computed the altitude and distance to the source, U.S. Patent 2,070,178, to F. M. Prottenger, Jr., et al., issued on Feb. 9, 1937, A more recent approach proposes that a series of sources be utilized to establish a radiation corridor of such shape that an instrument on the aircraft can locate the position and deviation from a preselected glide slope, U.S. Patent 2,992,330, to J. M. Cooper et al., issued July 11, 1961.

The aforementioned approaches are merely illustrative of the range of sophistication of apparatus and method for guiding aircraft. The method and apparatus of the present invention has general application to crafts of many types.

The guidance of a craft in foul weather remains a problem because the method must be reliable and the apparatus must be simple to operate, easy to install, and lightweight. Further, it is desirable to be able to locate the craft's position, even at short range, relative to a predetermined path in the most severe weather conditions.

A good example of the problem with existing guidance apparatus is the landing of an aircraft. Radio navigational aids, generally referred to as ILS, can bring the aircraft down to an altitude of about 300 feet, and then it becomes ineffective. Guidance systems using radar are inoperative at this low altitude because of ground reflections.

It is therefore a principal object of the present invention to provide method and apparatus for indicating position of a craft relative to a specified area in all kinds of weather.

It is a further object of the present invention to provide method and apparatus for indicating the drift and altitude deviation of a craft from a predefined path, such as the glide path of an aircraft.

Another object of the present invention is to provide method and apparatus for indicating the position of a craft at short range, such as at the low altitudes of an aircraft during landing.

It is a further object of the present invention to provide an improved apparatus for indicating position of a craft which is relatively low in cost, simple to build and install, and easy to operate.

These and other objects are accomplished by the present invention which is described with reference to a preferred embodiment of apparatus and method for guiding an aircraft. One form of the apparatus comprises a beacon of penetrative radiation sources to be disposed on opposite sides of a path the craft is to follow. Means is provided to be mounted on the craft for sensing the direction of the sources and indicating the position of the craft. In one embodiment the sensing means comprises two directional detectors having their pointing axes arranged at a fixed angle with respect to each other and pointing in the same general direction. In another embodiment, each of the directional detectors aligns its point axis with a different one of the sources to measure an angle between the pointing axis and a reference plane. One of the methods of the present invention comprises the steps of maneuvering the craft to a position at a distance from and between the sources to receive predetermined amounts of radiation at the detectors, thereby locating the craft on the path. The sources can be arranged, according to another method of the present invention, to control the path of the craft. For an aircraft the spacing between a pair of sources can be selected to provide any desired altitude at which the sensing means indicates the craft is on a predetermined glide path. The sources can radiate gamma rays, for example, over intersecting solid angles to penetrate the worst weather conditions. The alignment of the directional detectors with the source radiation is a function of the aircraft's deviation from a predetermined path and is used to compute the position of the aircraft.

A preferred embodiment of the present invention is described with reference to the figures, wherein

FIG. 5 is a block diagram of one type of computer for indicating the position of an aircraft in accordance with the present invention.

There are many applications for a method and apparatus that can guide or establish the position of a craft, or enable it to follow a predetermined path. Boats are frequently required to move on a course to avoid dangerous areas, or to dock at a prearranged landing. Aircraft must follow assigned routes and adhere closely to a prearranged glide path on the landing approach. In all of these examples, there is a need for guidance information irrespective of weather conditions. Lights that are normally effective at night when the weather is good to guide the pilot are of no use when the ceiling drops to 300 feet or less due to snow or fog.

The present invention in its preferred form makes use of nuclear penetrative radiation, normally gamma rays from radioactive sources, although X-rays can be used, that penetrate fog, snow or other atmospheric changes. Ranges up to 2000 feet or more can be reached consistently in any weather. The source strength can be tailored to fit the particular range needs. The intensity of the penetrative radiation does decrease with distance and can be used to measure range. However, the range measurement does not give enough information to determine the position of the craft.

The position of a craft can be determined, in accordance with the present invention, by the alignment of a directional detector means on the craft with a beacon having two sources of penetrative radiation spaced apart on opposite sides of a path over which the craft should travel. Each source can radiate omnidirectionally or at least over a substantial solid angle to intersect with the penetrative radiation of the other source in a region including the path of travel. The directional detector means provides for the measurement of the direction of the two sources from the craft with reference to the craft's present heading. When the craft is moving in a predetermined direction or heading and the sources are at prearranged angles either side of the craft's heading, the position of the craft is known. In other words, the sources are spaced to provide a region of radiation intersection and the alignment of the directional detector means with the radiation from each source at prearranged angles locates a position on a predetermined path. Angular deviations from these prearranged angles can be used to determine craft's position.

The directional detector means can be conveniently arranged to provide the angular measurements instantly, in one form of apparatus of the present invention, by having two directional detectors that have their pointing axes in the same plane and at a predetermined fixed angle of separation, at least for each measurement, to align with a source on each side of the direction axis or heading of the craft. When the craft moves between the sources in the region of radiation intersectoin on a predetermined path (heading in the desired direction) each detector will have a prearranged alignment relationship with the radiation from one of the sources. In another form of the apparatus, each of the directional detectors continuously tracks a different one of the sources to measure an angle with respect to a reference plane.

Additional points on the predetermined path can be established by a further arrangement, in accordance with the present invention. Another pair of sources is spaced a prearranged distance apart on opposite sides of the path. The radiation aligns with the directional detectors spaced at the same or another fixed angle, depending on the source spacing, thereby indicating the craft is on the predetermined path, corresponding to another range from the line between the sources.

Figure 1:
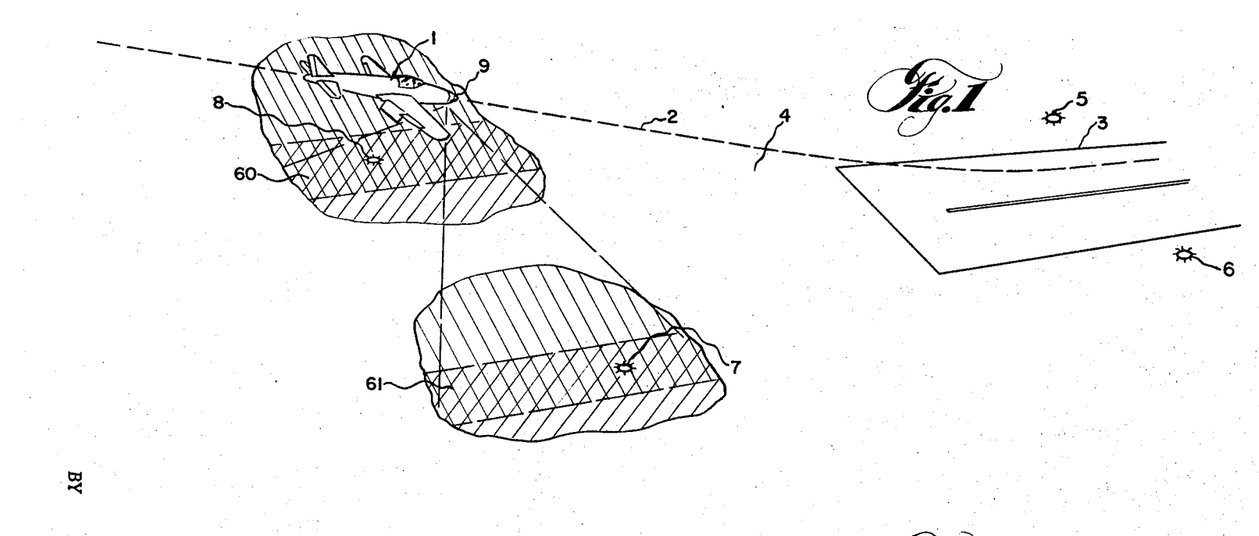
FIG. 1 is a perspective view of an aircraft approaching a landing field on a glide path, the aircraft and ground installation being equipped with one form of apparatus and practicing one of the methods of the present invention.

The present invention is illustrated by a preferred embodiment of apparatus and method for landing an aircraft. Other applications of the invention will be apparent. As depicted in FIG. 1, an aircraft 1 is following a predetermined glide path 2 (dash line) to land at runway 3 on ground 4. Along glide path 2 on ground 4 are sources of penetrative radiation, such as radioactive sources 5, 6, 7, and 8 of gamma rays. Sources 5 and 6 are spaced an equal distance on opposite sides of glide path 2, closer to the runway 3 than sources 7 and 8, which are similarly spaced an equal distance (not necessarily the same as the spacing of sources 5 and 6) on opposite sides of glide path 2.

Each of sources 5, 6, 7, and 8 is arranged to radiate penetrative radiation from ground 4 over a substantial solid angle or cone up to having an omnidirectional pattern in the azimuth and elevation. Radioactive materials can be selected in amounts to provide the necessary radiation intensity. For example, either of sources 10 or 11, FIGS. 9(a) and 9(b) respectively, can be used. Source 10 has a steel post 12 embedded at one end in concrete 13 to support a lead shield 14 containing a capsule 15 of radioactive material, such as Cobalt 60 or Cesium 137. Shield 14 has a conical opening at the top, with the vertex at capsule 15, thereby providing a broad radiation cone 20 of about 120° having a vertical axis. Source 10 is especially useful near the beginning of the glide path 2 where the source strength must be higher and a tall support can be tolerated. Source 11 is especially suited for use near runway 3, being supported on short legs 18 fixed in ground 4. Legs 18 carry the lead shield 16 having the radioactive material capsule 17 containing a moderate intensity gamma ray emitter, such as Cesium 137. The top of shield 16 has a conical opening with the vertex at capsule 17 to form a conical radiation beam 21 with the axis somewhat off the vertical in the direction of glide path 2.

Figure 9A:
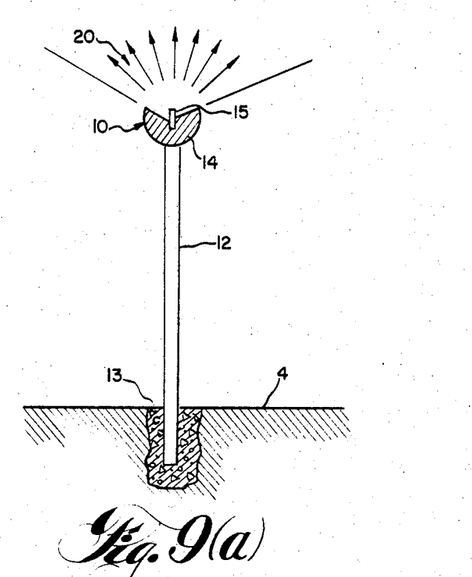
FIGS. 9(a) and 9(b) show two of several suitable arrangements for mounting the sources of penetrative radiation along a landing field approach.
Figure 9B:
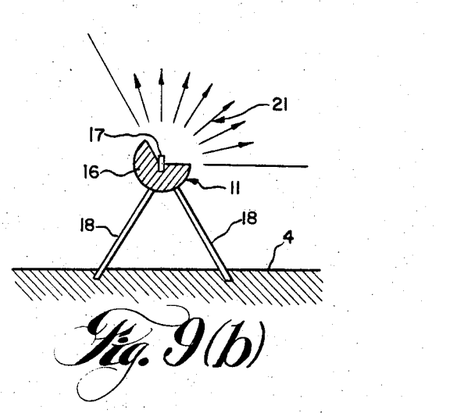

Turning back to FIG. 1, the sources 7 and 8 are of the type shown in FIG. 9(a) and sources 5 and 6 are of the type shown in FIG. 9(b) with the axes of the cones of radiation inclined toward each other. These source pairs each form a broad rgeion of intersecting radiation, i.e., where the solid angles of radiation intersect including the glide path 2. In this region aircraft 1 flies, carrying a directional detector means including a sensing means mounted in nose cone 9. As aircraft 1 flies between a source pair along glide path 2 there is an angular relationship between the direction of radmiation from each of sources 5 and 6, for example, that enables the directional detector means to determine the position of aircraft 1.

Figure 7:
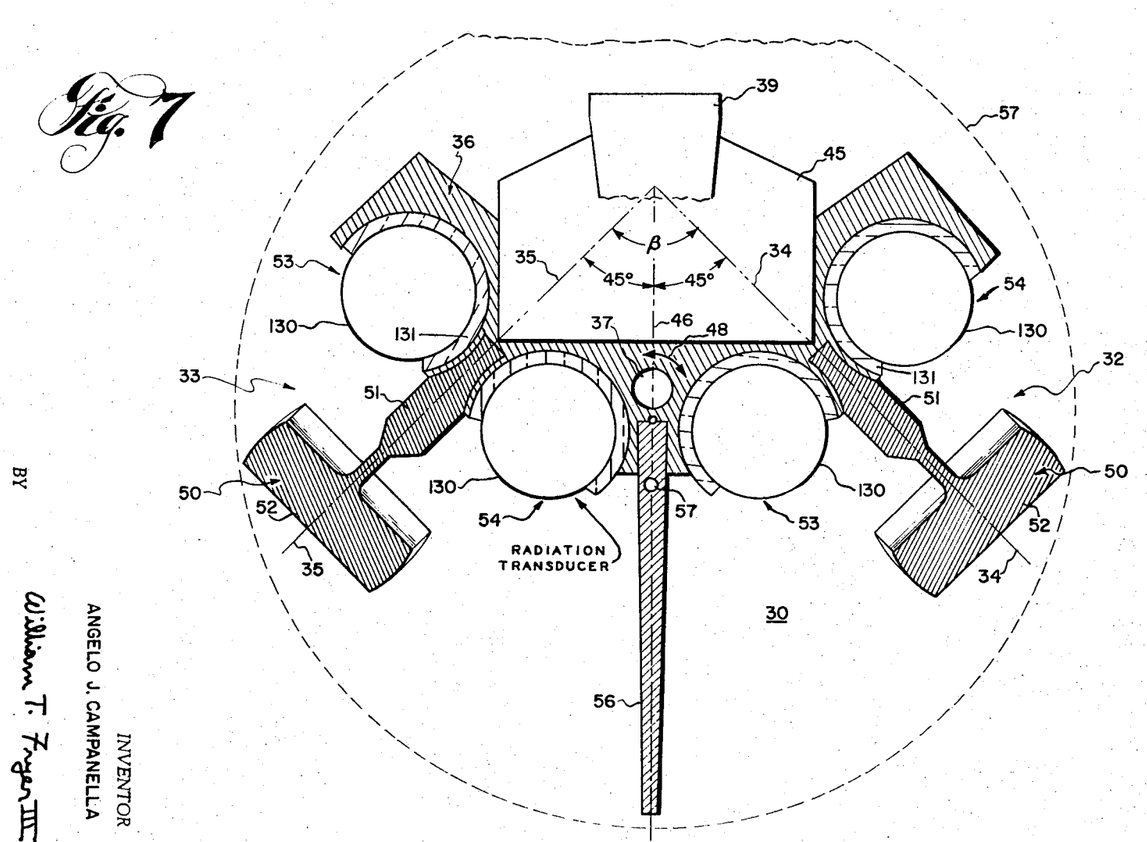
FIG. 7 is a front elevation view, partially in cross section, of one form of sensing apparatus of the present invention mounted in an aircraft.
Figure 8:
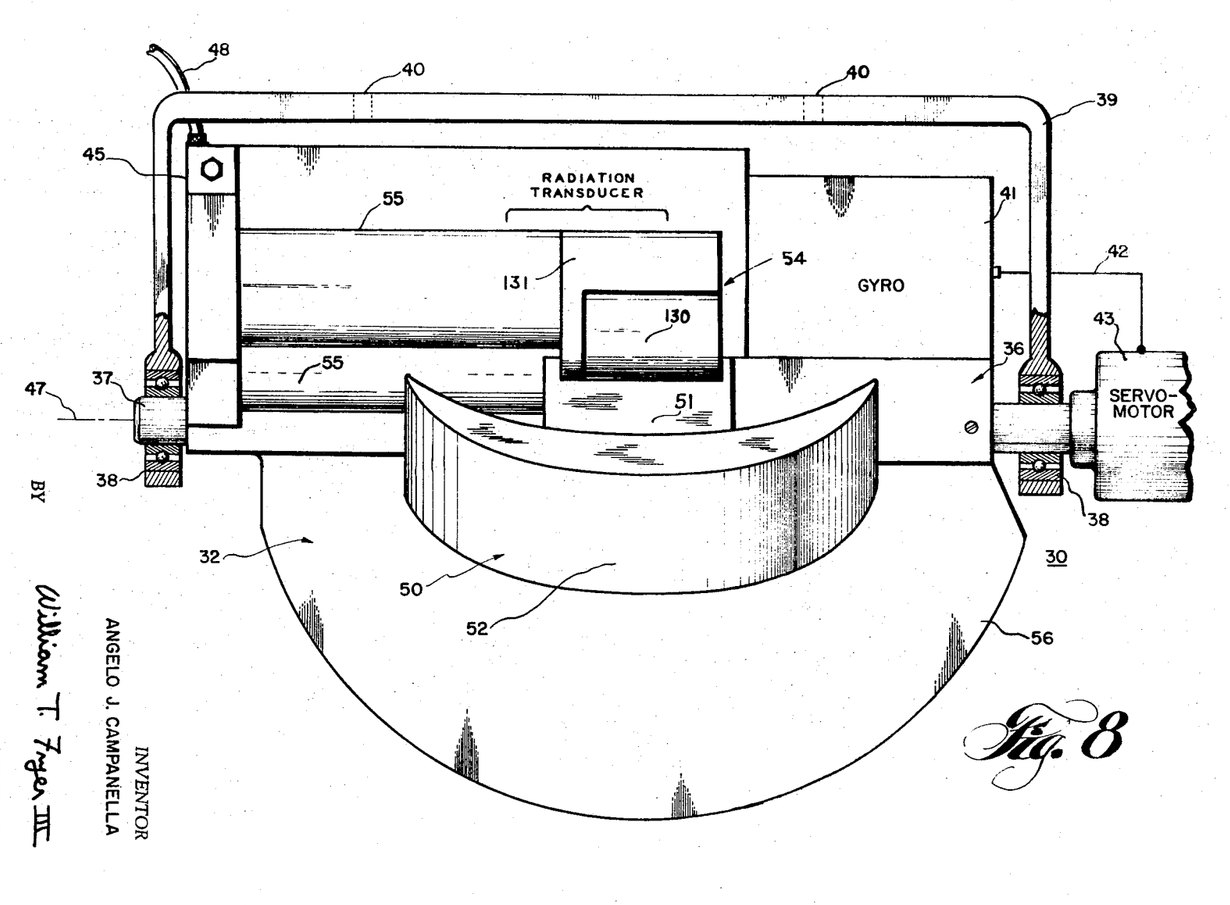
FIG. 8 is a side elevation view of the sensing apparatus shown in FIG. 7 with portions of the carriage removed for clarity.

The directional detector means includes a sensing means 30 (FIGS. 3, 7, and 8) and a computer 31 (FIG. 5). Sensing means 30 generally comprises two directional detectors 32 and 33 that each provide an electrical signal which is a function of the alignment of the directional detector with a source of pentrative radiation. As viewed in FIG. 3, the pointing axes 34 and 35, respectively, of the directional detectors 32 and 33 are held at a fixed angular separation; identified as angle $\beta$, say 90 degrees, 45 degrees either side of the vertical, aimed downward and to the side of aircraft 1, denoted by the outline of nose cone 9, in a plane at right angle to the length or roll axis of aircraft 1. Directional detectors 32 and 33 are mounted on a carriage 36 (FIGS. 7 and 8) fixed to a shaft 37 which is rotatably supported in bearings 38 at opposite ends in a U-shaped bracket 39 for movement in the direction of arrow 48 (FIG. 7). Shaft 37 has its axis 47 along heading of aircraft 1, coincident with the roll axis of aircraft 1. Brackets 39 is rigidly fastened to the aircraft 1, such as by a longitudinally projecting A-frame (not shown) secured through bolts (not shown) in holes 40.

Sensing means carriage 36 can be fixed in position so that when the wings of aircraft 1 are horizontal, the bisector 46 of the angle $\beta$ is orientated vertically with reference to ground 4. Alternatively, and in this preferred embodiment, carriage 36 is maintained at this vertical orientation irrespective of the roll of aircraft 1. A gyro 41 is mounted on carriage 36 to provide a signal over line 42 to a servomotor 43. The signal from gyro 41 on line 42 is a function of the deviation of carriage 36 from the vertical and servomotor 43 continuously positions carriage 36 to place the bisector 46 of angle $\beta$ on the vertical. Servomotor 43 can be eliminated altogether when the inertia of the assembly supported on shaft 37 is small and the gyro 41 has sufficient rotational inertia to stabilize the assembly on a vertical reference axis. In this case, the center of gravity of the assembly must be below the center of the shaft 37.

Also mounted on carriage 36 is a housing 45 for the electronics of computer 31, to be described hereinafter, with the computer output being coupled over cable 48 to instruments in the cockpit of aircraft 1.

Each of directional detectors 32 and 33 comprises a shadow edge member 50 having a T-shaped form. Shadow edge member 50 has its leg 51 secured in carriage 36 and its cross arm 52 located to partially cast a shadow with radiation from the far side of cross arm 52 on two radiation transducers 53 and 54 mounted on carriage 36 at opposite sides of leg 51. Each of radiation transducers 53 and 54 provide an output signal proportional to radiation intensity striking its front face 130. For example, each of radiation transducers 53 and 54 is a scintillation crystal coupled to a photo-multiplier 55 by a light pipe 131.

Directional detectors 32 and 33 are separated by a blinder shield 56 secured to carriage 36 and extending along the bisector 46 of angle $\beta$, downward, so that radiation reaching directional detectors 32 and 33 comes substantially only from one side of aircraft 1. The overall weight distribution of carriage 36, directional detectors 32 and 33 and the other equipment mounted on carriage 36 is such that the nominal center of gravity is below the axis 47 of shaft 37 on the bisector 46 of angle $\beta$ at location 57 on blinder 56. Sensing means 30 then assumes the position as shown in FIG. 7 when aircraft 1 is flying with its wings horizontally and is free to rotate within the free space outlined as 57 in nose cone 9, to about a 30 degree limit in either direction determined by carriage 36, as aircraft 1 rolls. Even with the roll of aircraft 1, sensing means 30 is held in the same vertical position by gyro 41 and servomotor 43, as described previously.

The operation of sensing means 30 begins after other guidance systems, such as ILS bring aircraft 1 (FIG. 1) in the region between the sources 7 and 8 heading toward runway 3. In this region sources 7 and 8 have intersecting solid angles of radiation. Directional detectors 32 and 33 are sensitive to radiation from narrow strips 60 and 61, respectively (cross hatched area), on ground 4. When aircraft 1 is on glide path 2, the pointing axes of directional detectors 32 and 33 are aligned with radiation from sources 8 and 7, respectively, as shown in FIG. 1. Computer 31 indicates that there is alignment and the pilot knows he is on the predetermined glide path 2.

Figure 3:
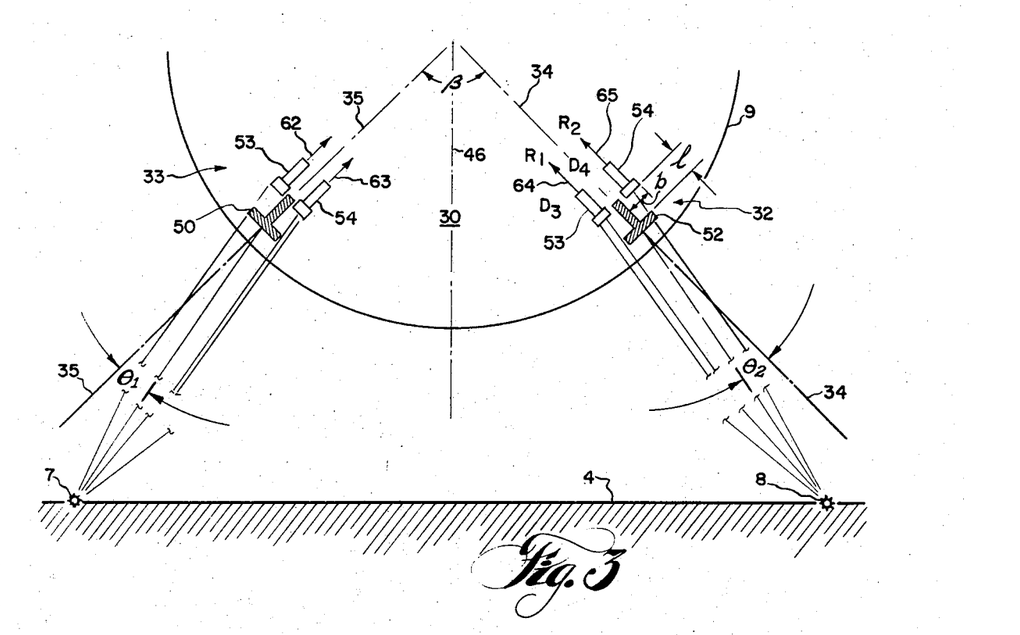
FIG. 3 is an elevation view, greatly enlarged in part for clarity, showing the front of an aircraft equipped with one form of apparatus of the present invention passing between penetrative radiation sources along a predetermined path.

When aircraft 1 is not on glide path 2, directional detectors 32 and 33 are not aligned with sources 8 and 7, respectively (FIG. 3). The misalignment or deviation from alignment is measured by angles $\theta_2$ and $\theta_1$, respectively, the angles between the pointing axes 34 and 35, respectively, and the direct radiation line from sources 8 and 7, respectively, to the directional detectors 32 and 33. The angular misalignments are measured by directional detectors 32 and 33. For example, directional detector 33 has equal radiation impinging on radiation transducers 53, caused by equal shadows cast by shadow edge member 50, when the radiation from source 7 is aligned with its pointing axis 35 and radiation transducers 53 and 54 producing equal electrical pulse rates at outputs 62 and 63, respectively. When the radiation is not aligned, unequal shadows will be cast by shadow edge member 50, more radiation reaching radiation transducer 54 than radiation transducer 53 in the illustrated relation (FIG. 3). The pulse count rate at output 63 from radiation transducer 54 will be higher, the difference in pulse count rates being a function of $\theta_1$, the angular misalignment of directional detector 33. Similarly, the difference between pulse rates at outputs 64 and 65 of radiation transducers 53 and 54 is a function of $\theta_2$, the angular misalignment of the directional detector 32.

Figure 4:
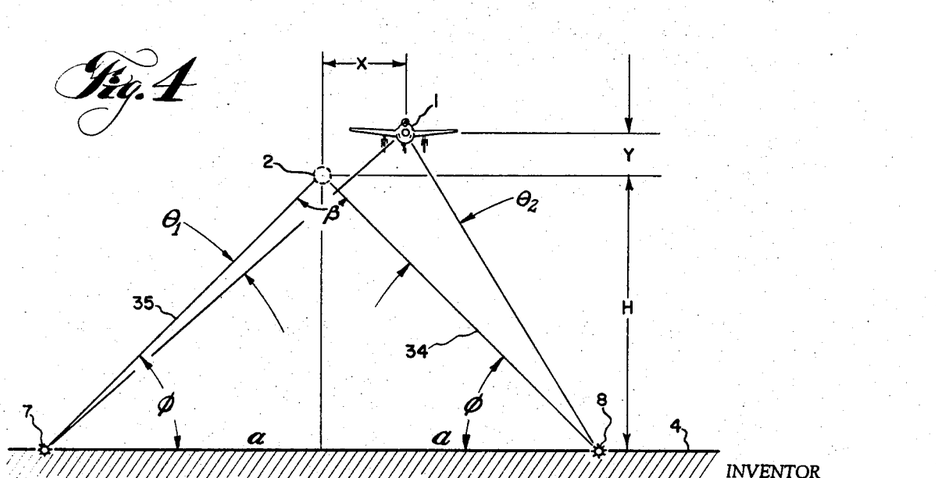
FIG. 4 is an elevation view of an aircraft equipped with one form of apparatus of the present invention approaching between penetrative radiation sources and not on the glide path to illustrate one method of the present invention.

The geometry of the landing of aircraft 1 is shown in FIG. 4, wherein sources 7 and 8 are each spaced a distance "$a$" on ground 4 from the line of glide path 2. When aircraft 1 is on glide path 2 the pointing axes 34 and 35 of directional detectors 32 and 33 are aligned with sources 8 and 7, respectively, forming angles $\phi$ with ground 4. Aircraft 1 is shown to the side of glide slope 2 (FIG. 4) by a horizontal distance X, drift, and above by a vertical distance Y, altitude deviation, from the glide path altitude H. The angular deviations from pointing axes 34 and 35 of directional detectors 32 and 33 are $\theta_1$ and $\theta_2$, respectively. The geometrical relationship can be expressed mathematically ($\theta_1$ and $\theta_2$ being defined as positive for respective elevation increases above $\phi$) as $$(H+Y) = (a+X)\tan(\theta_1 - \phi) \quad (1)$$
$$(H+Y) = (a-X)\tan(\theta_2 + \phi) \quad (2)$$

An exact solution for altitude deviation and drift in terms of $a$, $\phi$, $\theta_1$, and $\theta_2$ and H is $$Y = a\left[\frac{\cos(\theta_2 - \theta_1) - \cos(\theta_2 + \theta_1)\cos 2\phi + \sin(\theta_2 + \theta_1)\sin 2\phi}{\sin(\theta_2 + \theta_1)\cos 2\phi + \cos(\theta_2 + \theta_1)\sin 2\phi}\right] - H \quad (3)$$

$$X = a\left[\frac{\sin(\theta_2 - \theta_1)}{\sin(\theta_2 + \theta_1)\cos 2\phi + \cos(\theta_2 + \theta_1)\sin 2\phi}\right] \quad (4)$$

A computer can be arranged to solve Equations 3 and 4 to readout Y and X for guidance of aircraft 1. With the arrangement of sensing means 30 where $\phi$ equals 45 degrees, Equations 3 and 4 are simplified for small values of $\theta_1$ and $\theta_2$ in the immediate vicinity of glide slope 2 to $$Y \cong a(\theta_2 + \theta_1) \quad (5)$$
$$X \cong a(\theta_2 - \theta_1) \quad (6)$$

Figure 6:
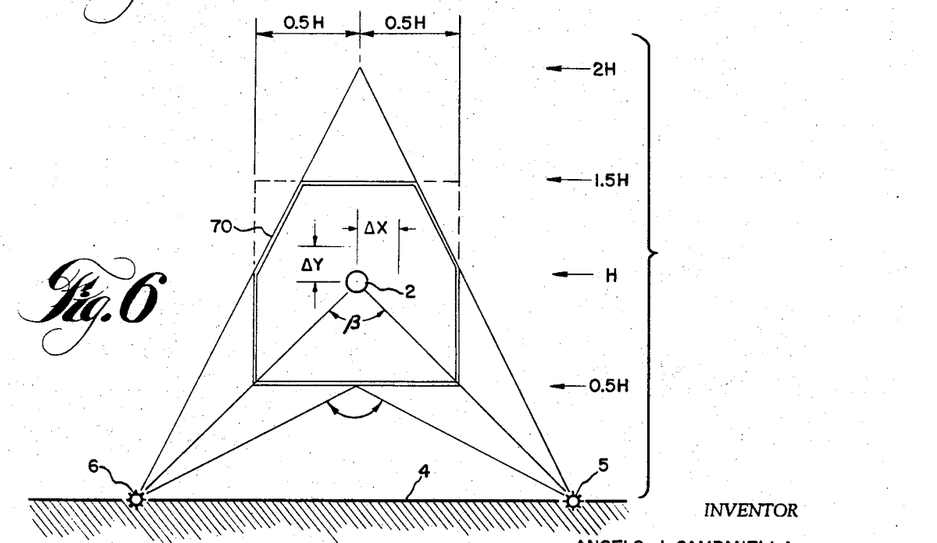
FIG. 6 is a schematic presentation of one example of the dimensional and angular relationships existing when an aircraft employs the method and apparatus of the present invention.

The quantitative measurement of $\theta_1$ and $\theta_2$, is provided by directional detectors 32 and 33, as described above. Computer 31 (FIG. 5) processes the outputs from radiation transducers 53 and 54 to obtain an electrical signal that is a function of X, drift, and an electrical signal that is a function of Y, altitude deviation. On either side of glide path 2, as well as above or below, these signals will be produced. When aircraft 1 flies within the region defined by the truncated rectangular outline 70 (FIG. 6) the signals are substantially a function of the deviations. Outside region 70 no signal change occurs, but the sense of the deviation is retained. For a glide path altitude of 400 feet, the positional uncertainty in either altitude or drift is about ±33.7 feet for 10 curie Cobalt-60 sources. By the time a glide path altitude of 100 feet is reached, this uncertainty becomes about ±1.5 feet, showing a great increase in accuracy as the aircraft's altitude decreases. On the glide path 2 near runway 3, where the source separation cannot be less than about 100 feet, corresponding to a 50-foot altitude when $\phi = 45°$, the achievable accuracy is about 1 foot. The range of signal proportionality extends down to approximately one-half this height, i.e., 25 feet, the altitude indicator can be calibrated to an accuracy of about ±1 foot.

The output signals from directional detectors 32 and 33 are coupled to separate pulse height discriminators 75, 76, 77, and 78 in computer 31 (FIG. 5) that select a range of pulse amplitudes that appear at outputs 79, 80, 81, and 82, respectively. The range includes the particular radiation energies of the sources, eliminating low energies, preferably, that are secondary or noise radiation. The combination of the discriminator outputs to indicate the position of aircraft 1 can be expressed mathematically as $$\frac{S_{62} - S_{63}}{S_{62} + S_{63}} \propto S_{\theta_1} \quad (7)$$

$$\frac{S_{64} - S_{65}}{S_{64} + S_{65}} \propto S_{\theta_1} \quad (8)$$

$$S_{62} + S_{63} + S_{64} + S_{65} \propto S_R \quad (9)$$

$$S_{\theta_1} + S_{\theta_2} \propto S_y \quad (10)$$

$$S_{\theta_2} - S_{\theta_1} \propto S_x \quad (11)$$

Where S represents the output signal from the radiation transducer designated by the sub-number after passing through the associated discriminator or the resultant signal that is a function of the variable designated by the sub-letter, and R represents range or distance from the line between a pair of sources.

In terms of the major components of computer 31, the output signals $S_{62}$ and $S_{63}$ from discriminators 75 and 76, respectively, are coupled to a pulse rate difference discriminator 85 that produces a signal at output 86 that is a function of the difference between the pulse rates of $S_{62}$ and $S_{63}$. The same discriminator output signals are coupled to an adder 87 that produces a signal at output 88 that is a function of the sum of the pulse rates of signals $S_{62}$ and $S_{63}$. The output signal from adder 87 is divided into the output of difference discriminator 85 by a divider 89 to produce a signal $S_{\theta_1}$ that is a function of the alignment of directional detector 33 with a source.

The output signals from directional detector 32 are processed in a similar manner. The output signals $S_{64}$ and $S_{65}$ from discriminators 77 and 78, respectively, are coupled to a pulse rate difference discriminator 90 that produces a signal at output 91 that is a function of the difference between the pulse rates of $S_{64}$ and $S_{65}$. The same discriminator output signals are coupled to an adder 92 that produces a signal at output 93 that is a function of the sum of the pulse rates of signals $S_{64}$ and $S_{65}$. The output signal from adder 92 is divided into the output of difference discriminator 90 by a divider 94 to produce a signal $S_{\theta_2}$ that is a function of the alignment of directional detector 32 with a source.

The output signals $S_{\theta_1}$ and $S_{\theta_2}$ are added by an adder 95 to produce a signal $S_y$ that is a function of the altitude deviation Y. Signal $S_y$ is coupled to cockpit panel instrument such as ILS meter 96 to drive needle 97. When signal $S_y$ is zero needle 97 will point to zero, straight downward, indicating that there is zero altitude deviation from the glide path 2. The signals $S_{\theta_1}$ and $S_{\theta_2}$ are also subtracted in a subtractor 98 to provide an output signal $S_x$ that is a function of the drift S. Signal $S_x$ is coupled to ILS meter 96 to drive the other needle 100. When signal $S_x$ is zero needle 100 will point to zero, directly horizontal, indicating that there is zero altitude deviation from glide path 2.

The output signals from adders 88 and 92 are added by an adder 101 to provide a signal $S_R$ at output 102 that is a function of the sum of the radiation striking all of radiation transducers 53 and 54. Signal $S_R$ is used to drive a "ready flag" on ILS meter 96. When the total radiation exceeds a predetermined limit the flag disappears, telling the pilot that he may commence navigation using the penetrative radiation sources and directional detector means. While aircraft 1 is on ILS the ILS meter 96 can be connected to the ILS instrument with one of the flags coupled to the signal $S_R$. The meter 96 can be switched for use with computer 31, as described above. The altitude may be calculated from an exponential-inverse square law relation.

The signals $S_x$ and $S_y$ are also coupled to the automatic pilot 103 of aircraft 101 which can be switched on, if desired. Otherwise, the pilot can control aircraft 1, observing the aircraft's position from meter 96 and maneuvering the aircraft to minimize drift and altitude deviation from the glide path 2. Automatic pilot 103, when on, operates the flight controls to bring aircraft 1 onto glide path 2.

The components of computer 31 are conventional units and can take several forms. The pulse discriminators 75, 76, 77, and 78 can be alike and equivalent to a channel of a standard pulse height analyzer. Pulse rate discriminators 85 and 90 and adders 87 and 92, for example, can comprise a Schmitt trigger circuit for each input signal to produce uniform amplitude pulses at the rate of the input pulses, the two uniform pulse trains being summed at a junction, coupled through separate summing resistors, to a capacitor and resistor in parallel that provides a signal proportional to the average number of pulses. In the difference discriminators 85 and 90 one of the pulse trains is inverted to get the difference in pulse rates, while in the adders 87 and 92 the pulse trains of the same polarity are summed to add the pulse rates. A continuous electrical signal proportional to the difference or sum of the pulse rates is produced, as the case may be, and these signals are added or subtracted by conventional circuits to obtain signals $S_y$ and $S_x$.

Figure 2:
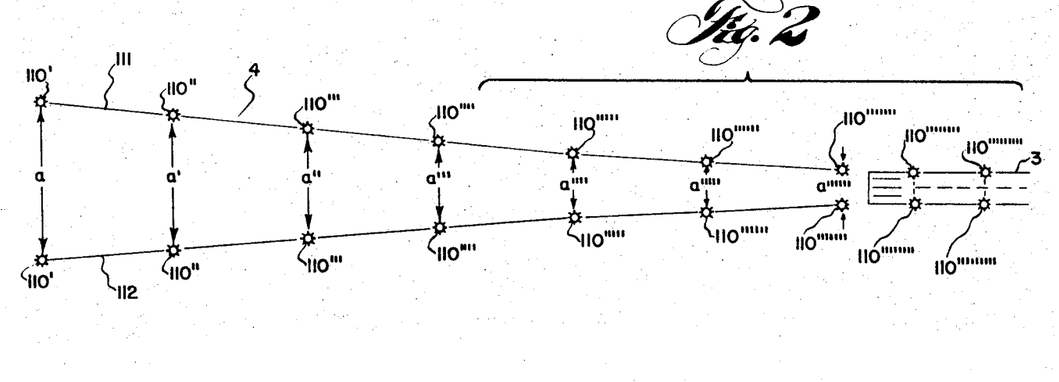
FIG. 2 is a plan view in schematic form of one arrangement of penetrative radiation sources along a landing approach in accordance with the present invention.

The position of aircraft 1 is indicated at several places along glide path 2, or any path, by using more than one source pair. For example, the sources 5 and 6 (FIG. 1) will be encountered next. As aircraft 1 passes between sources 5 and 6 computer 31 indicates the position. With the same angle $\beta$ of separation of the directional detectors 32 and 33 the source pair spacing can be varied to change the altitude at which there is alignment. For glide path 2, the source pairs 110 (each of sources 110 being of the type shown in FIGS. 9(a) or 9(b) and being designated by the same prime mark for the individual pairs) are arranged with decreasing spacing "a" (FIG. 2) as runway 3 is approached. The smaller spacing of source pair $a'''$, for example, brings aircraft 1 down to a lower altitude at which there is alignment, i.e. zero drift and altitude deviation, than the next preceding spacing $a''$. All of sources 110 with prime marks are referred to collectively, as are the spacings "a" with the prime marks, by the number without a prime marking. Said another way, the sources 110 are placed on a pair of lines 111 and 112 which converge on the near end of runway 3. The angle of convergence of lines 111 and 112 is adjusted so that, if aircraft 1 passes over each pair of sources 110 at the proper altitude, then the desired angle of glide path 2, in the range of 2.5 to 6 degrees is maintained. The final sets of sources on runway 3, source pairs $110''''''$ and $110'''''''$, can be spaced just outside lines 111 and 112 to initiate flareout.

The pilot need not maintain a zero roll position since sensing means 30 is stabilized with reference to the vertical by gyro 41. If carriage 36 was fixed to aircraft 1 with the bisector 46 vertical when aircraft 1 is horizontal, the pilot can follow the glide path 2 by using his artificial horizon to keep aircraft 1 level during readings.

Another form of the present invention for sensing the direction of the sources by measuring angles between the directional detector point axes with respect to a reference plane as the directional detectors track separate sources and indicating the position of a craft is illustrated by reference again to FIG. 3. Each of directional detectors 32 and 33 can be carried by separate adjustable supports (not shown) mounted on vertically stabilized carriage 36 (FIG. 7), for angular movement of its point axis in the same plane as the other pointing axis. For example, the plane common to the pointing axes can be at right angle to the heading of aircraft 1 as shown herein (in the plane of the drawing sheet of FIG. 3). The angular position of each of directional detectors 32 and 33 can be controlled to continuously track a different one of the sources, as aircraft 1 flies in a radiation corridor, by comparing the outputs of the respective radiation transducers 62 and 63, for example, and providing a signal that is a function of the difference, preferably, a ratio of the difference and sum, as mentioned previously. The ratio signal can control a servomotor that continues to adjust the directional detector position until there is alignment, indicated by equal outputs from the radiation transducers 62 and 63. The angular position of each of pointing axes 34 and 35 is measured with reference to the vertical 46, by a potentiometer coupled to the carriage mounting shaft, for example, and the position responsive signals can be coupled to a computer to indicate the position of aircraft 2. For example, at a known height equal angles can indicate that aircraft 2 is equally spaced between the sources. The computer can provide control signals for automatically changing the position of aircraft 2 to a desired path.

A disclosed embodiment of the present invention having been described, it is apparent that other embodiments are equally practical. The aircraft can be any flying machine, such as a helicopter or jet liner. The craft can be a boat or other water or land vehicle. The individual components of the disclosed apparatus can be changed without departing from the present invention. For example, the radiation transducers can be proportional counters or other types of radiation measuring devices and the computer can be arranged to perform the necessary operations to indicate the craft's position. Also, the shadow edge member need not be T shaped and can have other configurations or another form of directional detector can be used. The arrangement of sources need not only be for landing an aircraft. The sources can be arranged in other patterns to guide a craft along a predetermined path, including following an upward path by diverging the source pairs i.e. progressively increasing the spacing.

The method of the present invention can be practiced either by the pilot or automatically whereby the craft is maintained on a predetermined path and several forms of apparatus can be utilized.

Therefore the present invention is not to be limited to the apparatus and method disclosed herein as a preferred embodiment or practice. The appended claims define the scope of the present invention.

What is claimed is:

1. Apparatus for providing flight information during landing of an aircraft, comprising,
    means for producing a radiation corridor comprising sources of penetrative radiation to be spaced on opposite sides of the landing approach to form a region of intersecting radiation along a predetermined glide path,
    means to be mounted on an aircraft for sensing the direction of said sources on opposite sides of the aircraft in said radiation corridor and indicating the position of said aircraft within said radiation corridor in vertical and horzontal planes.

2. Apparatus for providing flight information during landing of an aircraft, comprising:
    means for producing a radiation corridor comprising sources of penetrative radiation to be spaced on opposite sides of the landing approach, successive pairs of said sources being placed along and apart on opposite sides of the landing approach, the distance between sources of each pair progressively decreasing as the landing field is reached to control the glide path of the aircraft, and
    means to be mounted on an aircraft for sensing the direction of said sources on opposite sides of the aircraft and indicating the position of said aircraft relative to said glide path.

3. Apparatus, as described in claim 2, wherein,
    each of said sources comprises a radioactive material that produces gamma radiation upward and outward over a substantial volume to form intersecting solid angles of radiation over the landing approach,
    said sensing means comprises directional gamma detectors disposed at an angle with respect to each other and pointing in the same general direction.

4. An instrument for and aircraft to be combined with a penetrative radiation beacon having at least two sources at spaced areas on the ground for landing said aircraft, comprising,
    means to be mounted on the aircraft for continuously measuring the direction of radiation from the sources arriving on opposite sides of the aircraft from the vertical as said aircraft approaches and moves between said sources,
    computer means coupled to said detecting means for indicating the position of said aircraft between said sources in vertical and horizontal planes.

5. Apparatus, as described in claim 4, wherein,
    said detecting means comprises a separate directional detector for receiving the radiation on each side of said aircraft and having an output signal that is a function of the alignment with the respective source radiation,
    said computer means comprising means for computing the altitude deviation and drift of the aircraft from a predetermined path.

6. Apparatus, as described in claim 4, wherein,
    each of the sources comprises a radioactive material that radiates gamma radiation generally upward and outward over a substantial volume to form intersecting solid angles of radiation over the ground, and
    said detecting means comprises directional gamma detectors having pointing axes disposed at a fixed angle with respect to each other and pointing in the same general direction downward in opposite directions on either side of said aircraft,
    each of said directional detectors producing a signal that is a function of the angular alignment of the respective pointing axes and the direction of said source on the respective side of said aircraft, and
    said computer means comprising first means for combining said signals to produce a first signal that is a function of the drift of said aircraft from a predetermined glide path between said sources, and second means for combining said signals to produce a second signal that is a function of the altitude deviation of said aircraft from said glide path.

7. Apparatus for providing flight information during the landing of an aircraft, comprising,
    means disposed on the ground for producing a radiation beacon comprising at least two sources spaced apart to radiate penetrative nuclear radiation to form a region of intersecting radiation along a predetermined glide path between said sources,
    an aircraft,
    means installed on said aircraft for continuously measuring the direction of said sources as said aircraft moves between said sources and producing a signal responsive to the deviation of said aircraft from a predetermined glide path altitude and a signal responsive to the deviation of said aircraft from a predetermined glide path horizontal position between said sources, and
    means responsive to said signals for indicating position of said aircraft.

8. Apparatus, as described in claim 7, wherein,
    said sensing and indicating means comprises separate directional detector means having a wide angle of view in the direction along the length of said aircraft to be positioned on opposite sides of the aircraft for measuring angles between the vertical and the respective source direction, the point axes of said directional detector means lying in a plane transverse to the heading of the aircraft.

9. Apparatus, as described in claim 8, wherein,
    said pointing axes of the directional detectors are fixed relative to said aircraft and each of said directional detector means provides an output signal proportional to the alignment of the directional detector means with a different one of said sources.

10. Apparatus, as described in claim 7, wherein,
    each of said sources comprises a radioactive material that produces gamma radiation upwardly and outwardly over a substantial volume to form intersecting solid angles of radiation over the ground,
    said sensing and indicating means comprises two gamma radiation directional detectors arranged to be mounted on opposite sides of the aircraft at fixed locations relative to the vertical to point generally downward and outward.

11. An instrument for an aircraft to be combined with a radiation beacon having at least two sources of penetrative radiation at spaced areas on the ground, comprising,
    a carriage for pivotal connection to the aircraft, the pivotal axis of said support being along the roll axis of the aircraft and lying in a first plane extending generally downward and outward from said pivotal axis, directional detectors mounted on said carriage on opposite sides of said first plane and having their pointing axes lying substantially in a second plane transverse to said first plane and pointing at a fixed angle from said first plane to receive radiation from the sources and produce electrical signals proportional to the received radiation, means for positioning said carriage to maintain said first plane at substantially a vertical attitude with respect to the ground, computer means coupled to receive said signals and for indicating the position of the aircraft in vertical and horizontal planes.

12. Apparatus, as defined in claim 11, wherein, each of said directional detectors comprises radiation transducers positioned on opposite sides of a shadow edge member extending generally in a plane of said pivotal axis at a fixed angle from said first plane, each of said directional detectors producing a signal that is a function of the angular deviation between the shadow edge member plane and the direction of said respective source.

13. Apparatus, as described in claim 11, wherein, said carriage is pivoted on a shaft, said shaft is positioned by a servomotor controlled by a vertical gyro stabilizer, and a blinder shield is disposed between said directional detectors.

14. A method of guiding an aircraft on a glide path to a landing field in foul weather with the use of sources of penetrative radiation and directional detectors, comprising the steps of, positioning the detectors at a fixed angular separation pointed toward ground areas on opposite sides of the aircraft, positioning a number of pairs of sources on the ground along the glide path, the sources of each pair being disposed on opposite sides of the glide path at predetermined spacing, said source pair spacing for successive pairs of sources progressively decreasing to lower the glide path to the landing field, and maneuvering the aircraft in response to the alignment of the detectors with the radiation from said sources as the aircraft flies above and between said sources of each source pair to position the aircraft on the glide path.

15. A method of guiding the landing of an aircraft along a desired glide path in foul weather with the use of sources of penetrative radiation and directional detectors, comprising the steps of, positioning the detectors at a fixed angular separation pointed toward ground areas on opposite sides of the plane, positioning a number of pairs of sources on the ground along a selected path, the sources of each pair being disposed on opposite sides of said path at predetermined spacing, said source pair spacing for successive pairs of sources being selected to control the altitude of the path, maneuvering the aircraft to a position at a distance from and between each pair of said source to receive a predetermined amount of radiation at said detectors.

16. The method, as defined in claim 15, wherein, said sources are located on the ground on opposite sides of an aircraft landing approach to radiate penetrative radiation outwards and upwards, said detectors are mounted to extend generally downward and pointing away from opposite sides of the aircraft, and said aircraft is maneuvered to a position above and between said sources where each of said detectors are in alignment with radiation from a different one of said sources, thereby placing the aircraft on a desired glide path.

17. A method of arranging sources of penetrative radiation along a flight path for guiding an aircraft equipped with directional radiation detectors having pointing axes disposed at a fixed angle with respect to each other and pointing generally downward and outward from the respective sides of said aircraft, comprising the steps of, positioning a number of pairs of sources on the ground along said flight path, the sources of each pair being disposed on opposite sides of said path, at predetermined spacing, selecting said source pair spacing for successive pairs of said sources to control each directional detector on said altitude at which the aircraft is in a predetermined alignment with the direction of respective sources on one side of said aircraft when flying above and between each source pair.

18. The method, as described in claim 17, wherein, said aircraft is guided to a landing field by following a path between said sources of each pair, and said source pair spacing is selected to decrease progressively said altitude towards the landing field, thereby defining a glide path suitable for the aircraft.

19. An instrument for an aircraft to be combined with a penetrative radiation beacon having at least two sources at spaced areas on the ground for landing said aircraft, comprising:

means mounted on said aircraft for detecting radiation from the sources, said detection means comprising separate directional detectors for receiving the radiation arriving from the sources at fixed angles on opposite sides of the aircraft from the vertical and each of said directional detectors having an output signal that is a function of the alignment with the respective source radiation, each of said directional detectors comprises a shadow edge member aligned with said fixed angle, and radiation transducers on opposite sides of the shadow edge member for producing said signal in response to the radiation intensity, and computer comprises first means for obtaining a first signal that is a function of the difference in the electrical signals from the transducers of one directional detector and a second means for obtaining a second signal that is a function of the difference in the electrical signals from the transducers of the other directional detector, third means for obtaining a third signal that is a function of the sum of the electrical signals from said transducers of said one directional detector, fourth means for obtaining a fourth signal that is a function of the sum of the electrical signals from said transducers of said other directional detector, fifth means for obtaining a fifth signal that is a function of the ratio of said first and third signals, sixth means for obtaining a sixth signal that is a function of the ratio of said second and fourth signals, seventh means for adding said fifth and sixth signals to obtain a seventh signal that is a function of the altitude deviation of the aircraft from a predetermined altitude, and eighth means for subtracting said fifth and sixth signals to obtain an eighth signal that is a function of the drift of the aircraft from a predetermined position between the sources.

References Cited

UNITED STATES PATENTS

| | | | |
|---|---|---|---|
| 2,767,326 | 10/1956 | Stratford | 250—83.6 |
| 2,944,151 | 7/1960 | Whitney et al. | 250—83.31 |
| 2,975,284 | 3/1961 | Osborne | 250—83.31 |
| 2,992,330 | 7/1961 | Cooper et al. | 250—106 X |
| 3,099,834 | 7/1963 | Sarbacher | 250—106 X |

ARCHIE R. BORCHELT, *Primary Examiner.*

UNITED STATES PATENT OFFICE
CERTIFICATE OF CORRECTION

Patent No. 3,403,254   Dated Sept. 24, 1968

Inventor(s) Angelo J. Campanella

It is certified that error appears in the above-identified patent and that said Letters Patent are hereby corrected as shown below:

Column 4, line 24, "rgeion" should read ---region---; line 30, "radmiation" should read ---radiation---; line 38, "pentrative" should read ---penetrative---; lines 48 and 49, "direction" should read ---directions---; line 49, after "along" insert ---the---.

Claim 17, column 12, lines 15 and 16, delete "each directional detector on said" and insert ---the---; line 16, delete "the" and insert ---each directional detector on said---.

Signed and sealed this 25th day of January 1972.

(SEAL)
Attest:

EDWARD M. FLETCHER, JR.
Attesting Officer

ROBERT GOTTSCHALK
Commissioner of Patents